June 22, 1926.
H. A. WEILER
PIPE FITTING
Filed Sept. 18, 1924
1,589,729
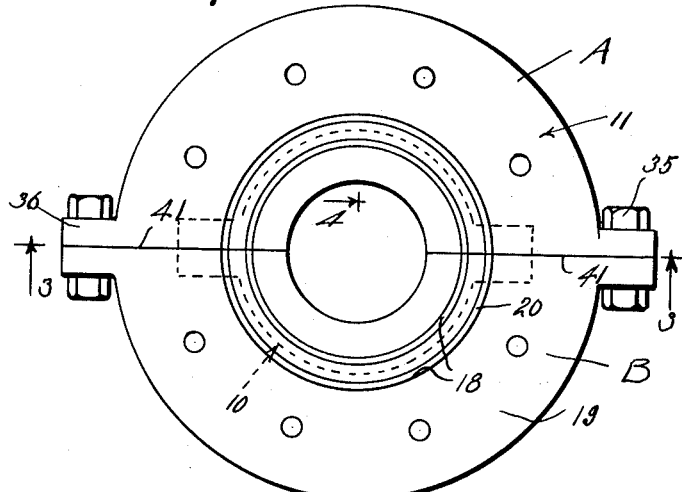
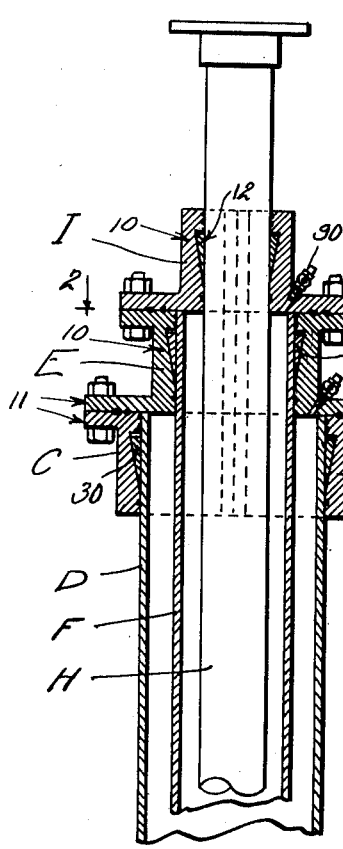
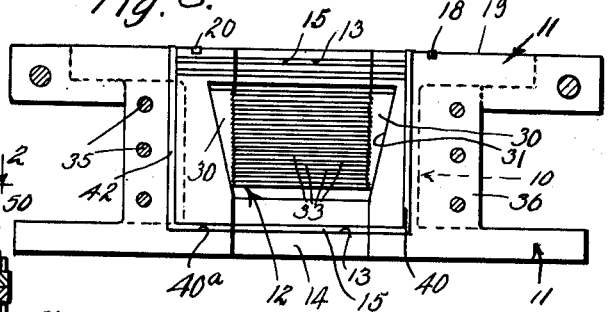
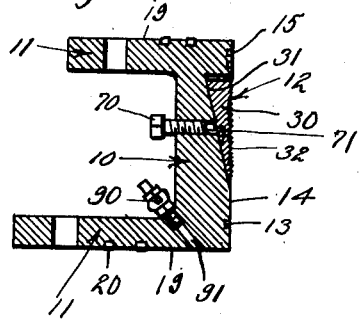
Inventor
Henry A. Weiler
by 
his Attorney Patented June 22, 1926.

1,589,729

UNITED STATES PATENT OFFICE.

HENRY A. WEILER, OF MONETA, CALIFORNIA, ASSIGNOR OF ONE-HALF TO PETER HAMMER, OF BELLFLOWER, CALIFORNIA.

PIPE FITTING.

Application filed September 18, 1924. Serial No. 738,396.

This invention has to do with a fitting useful in connection with pipes, casings and like members.

The fitting provided by this invention is suitable for use in various situations and under various conditions. It is particularly useful in connection with the casings of an oil well so therefore I have herein set forth a form of the invention designed for that purpose and have described the invention as applied to that specific use, it being understood that this disclosure is intended only to facilitate an understanding of the invention and is not to be considered as limiting the invention in its details of contruction or in its application.

In finishing an oil well the several strings of pipe or casing are connected together or joined at the top of the well. With the usual methods and equipment the connecting of the several casings involves several operations such as cutting, threading, etc., requires considerable equipment, and takes considerable time.

It is an object of this invention to provide a fitting by which several casings can be easily, quickly, and effectively connected.

It is another object of this invention to provide a fitting by which the several pipes or casings of a well can be effectively joined or connected in a particularly effective manner without performing various operations ordinarily necessary in such cases.

The various objects and features of my present invention will be best and more fully understood from the following detailed description of a typical form and application of the invention, throughout which description, reference is had to the accompanying drawings in which—

Fig. 1 is a vertical sectional view of the several casings of an oil well showing them joined at their upper ends by fittings embodying the present invention.

Fig. 2 is an enlarged plan view taken substantially as indicated by line 2—2 on Fig. 1.

Fig. 3 is a vertical sectional view taken as indicated by line 3—3 on Fig. 2 and Fig. 4 is a vertical sectional view taken substantially as indicated by line 4—4 on Fig. 3.

The fitting provided by this invention includes, generally, a cylindrical body 10, one or more flanges 11 on the body for connecting it with other fittings, or the like, means 12 for preventing longitudinal movement of the fitting with relation to the member to which it is applied, and various other features, the details of which will be hereinafter set forth.

The body 10 is in the form of an open ended cylinder, the internal diameter of which is made to receive the member or casing to which the fitting is to be applied. In practice the internal diameter of the body is made such that the body can be applied tightly to the casing. Means is provided for packing the body on or with the casing, which means may comprise grooves 13 formed in the inner wall 14 of the body and packing 15 arranged in the grooves 13 to engage the casing. The grooves 13 preferably extend around in the wall 14 in a transverse direction and it is preferred to provide the body with grooves 13 at points close to its ends as illustrated in Fig. 3 and Fig. 4 of the drawings.

Flanges 11 may be provided on the fitting for connecting it with other fittings, or the like. The flanges are preferably formed on the ends of the body 10 and are in practice shaped and proportioned to properly cooperate with other fittings, or like members. In certain cases it is desirable to provide the fitting with a connecting flange 11 at one end only, whereas in other cases it is desirable to provide the fitting with flanges at both ends. In Fig. 1 of the drawings I have illustrated both types of fittings. The connecting flanges 11 in addition to being shaped and proportioned to properly cooperated with the parts to which they are to be connected are provided with packing means including grooves 18 formed in the faces 19 of the flanges and packing 20 arranged in the grooves. In the preferred arrangement the grooves 18 are annular in form and are arranged concentrically in relation to the longitudinal axis of the fitting. It is desirable to provide each flange 11 with two or more grooves 18 substantially as I have illustrated in the drawings. The means 12, provided for preventing longitudinal movement of the fitting with relation to the casing to which it is applied, includes a plurality of wedges or slips 30 slidably carried in suitably tapered sockets or recesses 31 provided in the inner wall 14 of the body 10. The slips 30 are curved, wedge shaped members provided with inner gripping faces 32 which are of the same curvature as the wall 14 and are roughened or otherwise finished, for instance, with teeth 33 so that they will grip and hold the casing to which the fitting is applied. The recess 31 is in the form of an annular tapered recess formed in the inner wall 14 of the body preferably between two packing grooves 13. In accordance with my invention I provide means for holding the slips up, or out of operating position, while the fitting is being arranged on a casing. This means may include screws 70 carried by the body to extend into openings 71 in the backs of the slips. When it is desired to release the slips the screws are operated so that they withdraw from the openings.

In accordance with my invention the fitting is divided longitudinally into two separable sections A and B to facilitate its being applied to and removed from a casing, or the like. The fitting is preferably divided evenly so that the two sections are the same size and shape, it being desirable in practice to divide it longitudinally in a plane intersecting its longitudinal axis. The fitting is provided with means for releasably connecting the two sections A and B, which means may comprise a plurality of bolts 35 arranged to connect flanges 36 provided on the sections A and B, adjacent their line of joinder. The flanges 36 extend longitudinally of the fitting and are preferably formed integrally with the two sections as shown throughout the drawings. The fitting is provided with means for packing the two sections A and B together which means may comprise grooves 40 formed in the abutting faces 41 of the two sections and packing 42 carried in the grooves. The packing grooves 40 in the abutting faces of the sections A and B preferably extend longitudinally of the fitting and may be extended to join the packing grooves 18 in the flanges 11 in the manner illustrated in Fig. 3. In the preferred form of the invention longitudinal packing grooves 40 are provided on both sections A and B and are located differently in the two sections so that the packing grooves of the two sections do not register when the sections are together. In addition to the longitudinal packing grooves 40 the abutting faces are provided with transverse packing grooves 40^A which connect the longitudinal groove with the packing grooves 13 in the body 10.

Openings 91 may be formed in the fittings between the faces of the connecting flanges at the lower ends of the fittings and suitable points at the exterior of the fitting. The openings 91 preferably open into the flanges at points close to the inner edges of the flanges so that they will not be covered when in operating position as shown in Fig. 1. Suitable relief valves 90 are connected with the openings 91 at the exterior of the fitting.

In using fittings embodying the present invention to finish a well having a plurality of casings arranged one within the other, a fitting C having a connecting flange 11 at its upper end is applied to the upper end portion of the outer-most casing D. The fitting is applied to the casing D by arranging the two sections A and B thereof around the casing with the slips 30 in the sections and then clamping the sections tightly to the casing by means of the bolt 35. With the fitting C thus applied to the casing D the slips are released and the upper end of the casing may be trimmed off so that it is flush with the face 19 of the connecting flange of the fitting. A fitting E having connecting flanges at both ends is then applied to the second casing F, so that the connecting flange at its lower end engages the connecting flange on the upper end of the fitting C. The fitting E is applied tightly to the casing F with the slips in it and the connecting flanges of the fittings C and E are secured together, for instance, by means of bolts 50. It is to be noted that the lower end of the fitting E not only engages the connecting flange of the fitting C but also rests upon the upper end of the casing D. Upon a series of casings being thus connected the inner-most casing H may be provided with a fitting I provided at its lower end with a connecting flange for connecting with the fitting on the next outer casing. The innermost casing H is usually extended above the fitting I and is provided with a coupling 60 to which various members or apparatus may be connected. It is desirable in applying the fittings to the casings inwardly of the outer-most casing D to pull the casings upwardly so that they are tight or possibly under tension as the fittings are being applied and to release the hold or tension when the fittings have been made tight and the slips released. By doing this the slips within the fittings grip the casings and support them so that they are held tight and straight and so that a portion, if not all, of their weight is supported by the upper end of the outer casing D through the several fittings. This not only causes the several inner casings to be supported straight in the well but also causes the fitting C to be held down tightly and thus resist blowing out of the well between the casings E and F. The slips in the fitting C operate to grip the casing D and prevent the fitting C from being blown off the casing D. With the several fittings arranged and related as I have illustrated in the Fig. 1 of the drawings the casings of the well are effectively and securely connected, the packing means provided at the various parts of the fittings serving to make the various joints tight so that there is no leakage. Pressure that may develop or build up between the casings may be released by opening the relief valves 90.

From the foregoing description it will be apparent that I have provided a fitting which is simple and inexpensive of manufacture, which is convenient and simple to use and which greatly simplifies the finishing of an oil well.

Having described only a typical preferred form of my invention, I do not wish to limit myself to the specific details hereinabove set forth, but wish to reserve to myself any changes or variations that may appear to those skilled in the art or fall within the scope of the following claims.

Having described my invention, I claim:

1. A fitting of the character described including, two separable sections forming an open ended cylindrical body and a connecting flange at one end of the body, two spaced bodies of packing at the inner wall of the body, the inner wall of the body having a tapered recess located between said bodies of packing, and slips adapted to be arranged in the recess.

2. A fitting of the character described including, two separable sections forming an open ended cylindrical body and a connecting flange at one end of the body, the joining faces of the sections having grooves in them, packing carried by the grooves, the inner wall of the body having a tapered recess in it intermediate its ends, and slips slidably carried in the recess.

3. A fitting of the character described including, two sections, a flange connection between the sections, the sections forming an open ended cylindrical body and a connecting flange at one end of the body, there being two spaced grooves extending around in the inner wall of the body, grooves in the joining faces of the sections, and grooves in the face of the connecting flange, packing carried by the grooves, a tapered recess formed in the inner wall of the body between the grooves in the inner wall, and a plurality of slips slidably carried in the recess.

4. In combination, two casings arranged one within the other, a fitting applied to the end of the outer casing and having slips to prevent it from sliding off of the casing, and a second fitting applied to inner casing and having slips to prevent downward movement of the inner casing, the fittings being connected together.

5. In combination, two casings arranged one within the other, fittings applied to the ends of the casings and having slips to prevent them from sliding off of the casings, means whereby the fittings are connected together, and a valve controlled opening in one of the fittings opening into the space between the casings.

6. A fitting of the character described including, two separable sections forming an open ended cylindrical body and a connecting flange at one end of the body, the body having a tapered recess in its inner wall, and means for releasably holding the slips in the sections including screws extending inwardly through the walls of the sections and cooperating with recesses in the slips.

In witness that I claim the foregoing I have hereunto subscribed my name this 6th day of Sept. 1924.

HENRY A. WEILER.